US008920272B2

(12) United States Patent
 Tokita (10) Patent No.: US 8,920,272 B2
(45) Date of Patent: Dec. 30, 2014

(54) GUIDE PLATE AND CHAIN

(75) Inventor: Toshikazu Tokita, Mie (JP)

(73) Assignee: BorgWarner Inc., Auburn Hills, MI (US)

( * ) Notice: Subject to any disclaimer, the term of this patent is extended or adjusted under 35 U.S.C. 154(b) by 475 days.

(21) Appl. No.: 13/321,248

(22) PCT Filed: May 19, 2010

(86) PCT No.: PCT/US2010/035353
 § 371 (c)(1),
 (2), (4) Date: Nov. 18, 2011

(87) PCT Pub. No.: WO2010/138349
 PCT Pub. Date: Dec. 2, 2010

(65) Prior Publication Data
 US 2012/0065010 A1 Mar. 15, 2012

(30) Foreign Application Priority Data

May 26, 2009 (JP) .................................. 2009-126459

(51) Int. Cl.
 *F16H 7/06* (2006.01)
 *F16G 13/04* (2006.01)
(52) U.S. Cl.
 CPC ...................................... *F16G 13/04* (2013.01)
 USPC ......................................... 474/212; 474/140
(58) Field of Classification Search
 CPC ....................................................... F16G 13/04
 USPC ....................................... 474/206–218; 59/84
 See application file for complete search history.

(56) References Cited

U.S. PATENT DOCUMENTS

| 1,115,431 | A | * | 10/1914 | Howson | 474/213 |
| 5,779,582 | A | * | 7/1998 | Mott et al. | 474/140 |
| 5,799,479 | A | * | 9/1998 | Tanaka | 59/4 |
| 6,808,467 | B2 | * | 10/2004 | Takeda et al. | 474/111 |
| 8,137,226 | B2 | * | 3/2012 | Yoshida | 474/213 |
| 2008/0268996 | A1 | * | 10/2008 | Komada et al. | 474/213 |

FOREIGN PATENT DOCUMENTS

| JP | H0786378 B2 | 9/1995 |
| JP | H09217797 A | 8/1997 |
| JP | H1019100 A | 1/1998 |
| JP | 2002340113 A | 11/2002 |
| JP | 2008151316 A | 7/2008 |
| KR | 20040024189 A | 3/2004 |

OTHER PUBLICATIONS

International Search Report and Written Opinion; date of mailing Jan. 18, 2011 ; for international application No. PCT/US2010/035353 ; 8 pages.

* cited by examiner

*Primary Examiner* — William E Dondero
*Assistant Examiner* — Robert T Reese
(74) *Attorney, Agent, or Firm* — BrooksGroup (57) ABSTRACT

A guide plate 4 is disposed on the outermost side in the width direction of a silent chain 1 comprising link plates 2 which are pivotably linked by means of linking pins 3. The guide plate 4 has a pair of pin holes 41 into which the linking pins 3 are inserted, and also has side end parts 42 which are disposed at both ends in the longitudinal direction thereof, and an upper end part 43 and a lower end part 44 which link the side end parts 42 in the longitudinal direction. The upper end part 43 and the lower end part 44 are formed with a tapered transverse section, and become steadily thinner toward the tip end.

11 Claims, 6 Drawing Sheets

GUIDE PLATE AND CHAIN

TECHNICAL FIELD

The technical field relates to a guide plate for use on the outermost side of a timing chain, a combination of such a guide plate and chain, and methods of making and using the same.

A silent chain is used as a timing chain in motor vehicles and motorcycles etc. The silent chain generally has a configuration in which a large number of links each having a pair of tooth parts and pin holes are linked in a pivotable manner by linking pins which are inserted into each pin hole, while guide plates are arranged on the outermost side.

Furthermore, a chain guide for guiding the travel of the chain is disposed on the tension side span of the silent chain, and a tensioner arm for eliminating chain elongation during operation is disposed on the slack side span. The chain guide and the tensioner arm both have a chain travel surface over which the chain slides during travel, and a pair of upright wall parts which are provided on both sides of the chain travel surface in the width direction in order to restrict the deviation of the chain in the width direction during travel when the outside surfaces of the chain guide plates come into sliding contact therewith.

When the chain travels over the chain travel surface of the chain guide or tensioner arm during operation of the silent chain, the outside surfaces of the guide plates come into silent contact with the inside surfaces of the upright wall parts of the chain guide or tensioner arm. At this point, the outside surfaces of the guide plates make surface contact with the inside surfaces of the upright wall parts, and therefore the sliding resistance increases, producing friction loss. This kind of friction loss reduces the operating efficiency of the chain, and also leads to increases in oil temperature due to the heat generated, and therefore it is desirable to reduce friction loss as far as possible during operation.

Another point to consider is that there have been strong demands recently in the automotive field for improved fuel consumption, in order to protect the environment, and therefore there is a need for improvements in terms of reducing friction loss in silent chains as they travel.

In this regard, FIGS. 4 and 6 of Japanese Unexamined Patent Application Publication 2008-151316 show that hemispherical protrusions are provided on the outside surfaces of the guide plates, and these protrusions come into sliding contact with the upright wall parts of the chain guide or tensioner arm, bringing about a reduction in the sliding friction when the guide plates come into sliding contact with the upright wall parts, but in such a case, the guide plates need to undergo a separate pressing process in order to form the protrusions thereon, which complicates the production process.

Furthermore, FIG. 8 of Japanese Unexamined Patent Application Publication H10-19100, and FIGS. 4 and 5 of Japanese Unexamined Patent Application Publication 2002-340113 show a system in which the upright wall parts of the chain guide or tensioner arm are formed with a tapered shape, but in such a case, the chain rides up on the tapered upright wall parts when the chain resonates, or similar, and so there may be times when the chain moves in the width direction.

SUMMARY OF ILLUSTRATIVE VARIATIONS

One variation includes a guide plate for use on the outermost side in the width direction of a chain comprising inside links which are pivotably linked by means of linking pins. The guide plate has a pair of pin holes into which the linking pins are inserted, and also has side end parts which are disposed at both ends in the longitudinal direction thereof, and upper and lower end parts which link the side end parts in the longitudinal direction; and the upper end part and/or the lower end part becomes steadily thinner toward the tip end.

Another variation may include a chain having inside links having a pair of pin holes are pivotably linked by means of linking pins, and in which guide plates are disposed on the outermost side. The guide plates have a pair of pin holes into which the linking pins are inserted, and also have side end parts which are disposed at both ends in the longitudinal direction thereof, and upper and lower end parts which link the side end parts in the longitudinal direction; and the upper end part and/or the lower end part becomes steadily thinner toward the tip end.

In one variation, the upper end part and/or the lower end part of the guide plate becomes steadily thinner toward the tip end, and therefore when a chain assembled with such guide plates is traveling over a chain guide or tensioner arm during operation, the outside surface of the relevant end part of the guide plate does not make surface contact with the inside surfaces of the upright wall parts of the chain guide or tensioner arm, rather it makes linear contact whereby part of the surface makes contact in a linear fashion in the longitudinal direction. This makes it possible to reduce friction loss when the chain is operating. Furthermore, when the guide plate is produced, barrel finishing is generally carried out after the holes have been punched in the plate and the outer shape has been press-cut, and if the barrel finishing is carried out for longer than the normal processing time, it is clear that the tip end sections of the upper and lower end parts of the guide plate will undergo a greater amount of grinding than the base end sections, and therefore it is possible to easily make the upper and lower end parts become steadily thinner toward the tip end by such a process.

Moreover, in this case, the outside surfaces of the guide plate abut the inside surfaces of the upright wall parts of the chain guide or tensioner arm when the chain is operating, and therefore it is possible to reliably restrict deviation of the chain in the width direction.

In one variation, at least one of the upper end part and the lower end part of the guide plate is formed with a tapered transverse section.

In one variation, the upper and lower end parts of the guide plate both become steadily thinner toward the tip end.

One variation may include a chain having inside links having a pair of pin holes are pivotably linked by means of linking pins, and in which guide plates are disposed on the outermost side. The guide plates have a pair of pin holes into which the linking pins are inserted, and also have side end parts which are disposed at both ends in the longitudinal direction thereof, and upper and lower end parts which link the side end parts in the longitudinal direction; and the upper end part or the lower end part has an oblique face which comes into linear contact with upright wall parts of a chain guide or tensioner arm.

In one variation, the upper end part or the lower end part of the guide plate has an oblique face which comes into linear contact with the upright wall parts of the chain guide or tensioner arm, and therefore when a chain assembled with such guide plates is traveling over the chain guide or tensioner arm during operation, the oblique face of the upper end part or lower end part of the guide plate comes into linear contact with the inside surface of the upright wall parts of the chain guide or tensioner arm. This makes it possible to reduce friction loss when the chain is operating. Furthermore, when the guide plate is produced, barrel finishing is generally carried out after the holes have been punched in the plate and the outer shape has been press-cut, and if the barrel finishing is carried out for longer than the normal processing time, it is clear that the upper end part or lower end part of the guide plate will undergo a greater amount of grinding than the central section, and therefore it is possible to easily form an oblique face at the upper end part or lower end part by such a process.

Moreover, in this case, the outside surfaces of the guide plate come into linear contact with the inside surfaces of the upright wall parts of the chain guide or tensioner arm when the chain is operating, and therefore it is possible to reliably restrict deviation of the chain in the width direction.

In one variation, the chain is a silent chain.

In one variation, the chain is a roller chain or a bush chain.

In one variation, the upper end part and/or the lower end part of the guide plate becomes steadily thinner toward the tip end, and therefore when a chain assembled with such guide plates is traveling over a chain guide or tensioner arm during operation, the outside surface of the relevant end part of the guide plate does not make surface contact with the inside surfaces of the upright wall parts of the chain guide or tensioner arm, rather it makes linear contact whereby part of the surface makes contact in a linear fashion in the longitudinal direction. This makes it possible to reduce friction loss when the chain is operating. Furthermore, when the guide plate is produced in this case, it is possible to make the upper and lower end parts become steadily thinner toward the tip end simply by extending the processing time of the barrel finishing to which guide plates are conventionally subjected, for example, and therefore it is possible to reliably restrict friction loss when the chain is operating.

Moreover, in this case, the outside surfaces of the guide plate abut the inside surfaces of the upright wall parts of the chain guide or tensioner arm when the chain is operating, and therefore it is possible to reliably restrict deviation of the chain in the width direction during travel.

BRIEF DESCRIPTION OF THE DRAWINGS

FIG. 4 (*a*) is an enlarged front view of a guide plate; and (*b*) is an enlarged side view of a guide plate.

FIGS. 1 to 6 illustrate a guide plate according to one variation of the invention, and a silent chain provided with such guide plates; the same reference symbols are used in the drawings to denote components which are the same or corresponding.

Figure 1:
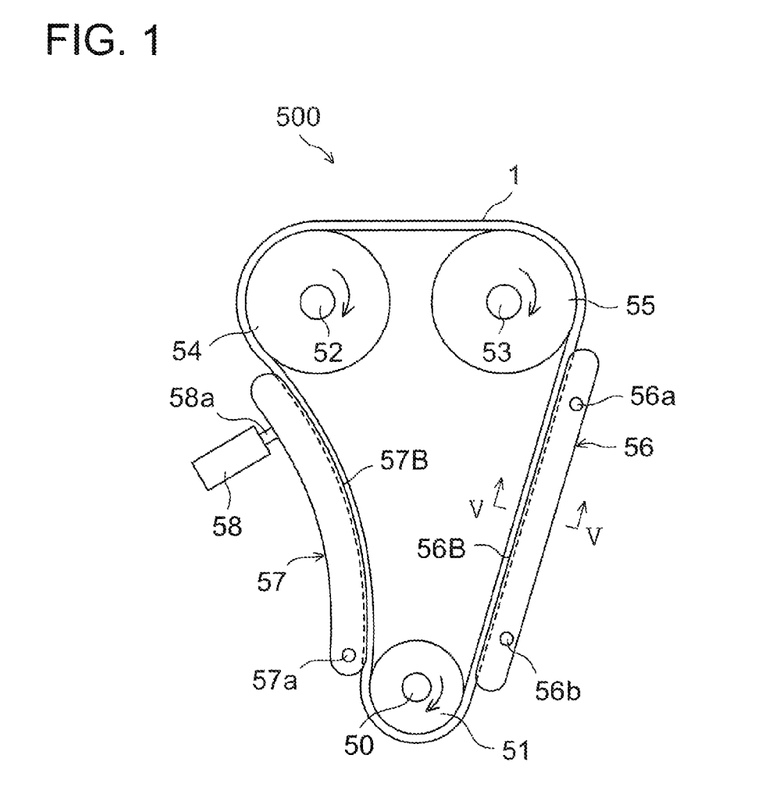
FIG. 1 is a schematic structural diagram of an engine camshaft timing system which employs a silent chain according to one variation of the invention.

As shown in FIG. 1, a camshaft timing system 500 in an engine which employs the silent chain according to one variation of the invention is provided with: a crank sprocket 51 which is attached to a crankshaft 50; cam sprockets 54, 55 which are attached to two camshafts 52, 53, respectively; and a silent chain 1 which is wound around these sprockets 51, 54, 55. It should be noted that the clockwise arrows in FIG. 1 denote the direction of rotation of the sprockets 51, 54, 55.

A chain guide 56 for guiding the travel of the silent chain 1 is disposed on the tension side span of the chain 1. The chain guide 56 is fixed to a member on the engine side by way of bolts 56*a*, 56*b* which are provided at both ends of the chain guide 56. A pair of upright wall parts 56B which are disposed on both lateral sides of the chain 1 as it travels are provided on the chain guide 56.

A tensioner arm 57 for maintaining tension in the silent chain 1 is disposed on the slack side span of the chain 1. The tensioner arm 57 is attached to a member on the engine side by way of a pivot bolt 57*a* which is provided at the pivoting end of the tensioner arm 57 to allowing pivoting thereof. A tensioner 58 which causes a pressing force to act on the tensioner arm 57 is provided at the free end of the tensioner arm 57. The tip end of a piston rod 58*a* of the tensioner 58 pressures the free end of the tensioner arm 57. A pair of upright wall parts 57B which are disposed on both lateral sides of the chain 1 as it travels are provided on the tensioner arm 57.

Figure 2:
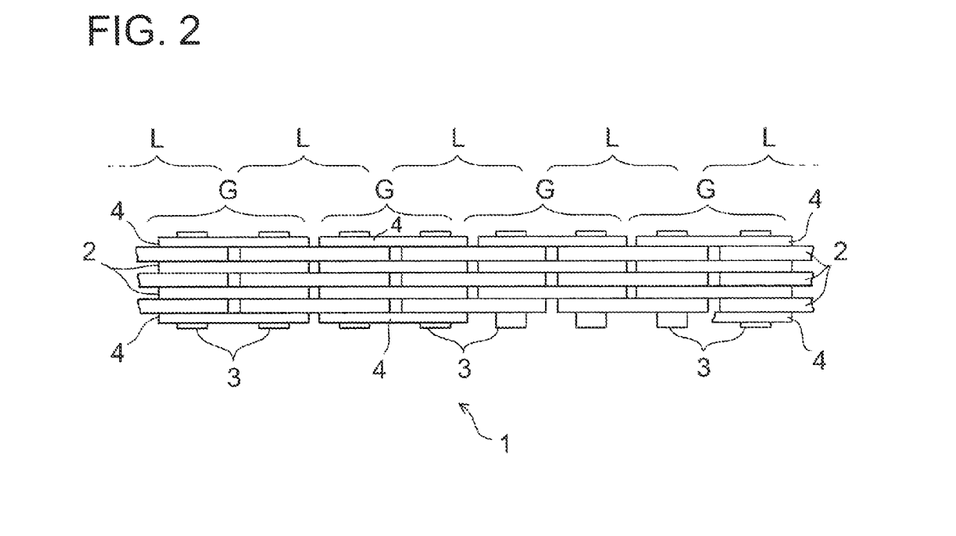
FIG. 2 is a partial plan view of the silent chain.
Figure 3:
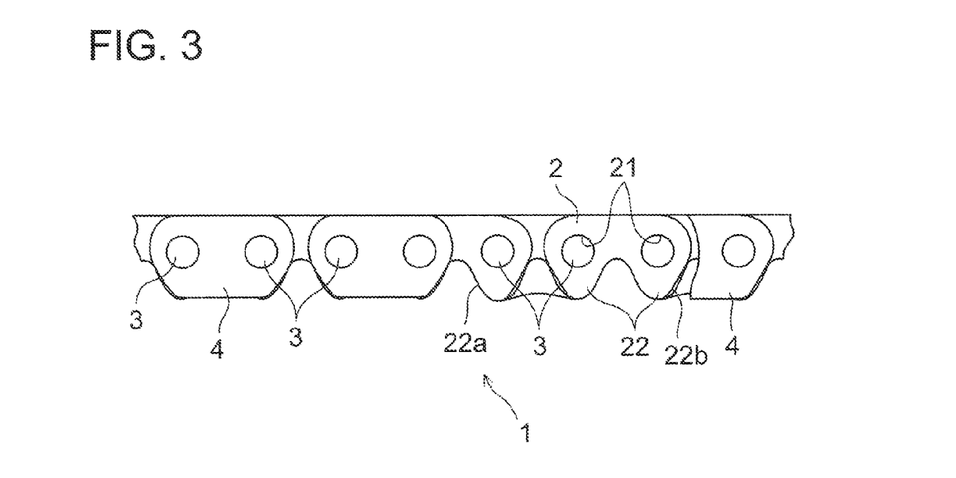
FIG. 3 is a partial front view of the silent chain.

As shown in FIGS. 2 and 3, the silent chain 1 has a configuration in which a large number of link plates (inside links) 2 are stacked in the thickness direction (the vertical direction in FIG. 2) and the longitudinal direction (the lateral direction in FIG. 2), and these link plates 2 are pivotably linked by linking pins 3, while guide plates 4 are disposed on the outermost side thereof.

The silent chain 1 has a plurality of guide rows G comprising guide plates 4 and link plates 2 which are disposed in the same position in the longitudinal direction as the guide plates 4, and a plurality of link rows L comprising only link plates 2 which are disposed between adjacent guide rows G in the longitudinal direction. The guide rows G and link rows L are alternately disposed in the longitudinal direction.

The link plates 2 have a pair of pin holes 21 and tooth parts 22. The linking pins 3 are inserted into the pin holes 21. The tooth parts 22 consist of inside flank faces 22*a* and outside flank faces 22*b* which mesh with the sprocket teeth (not depicted).

Figure 4:
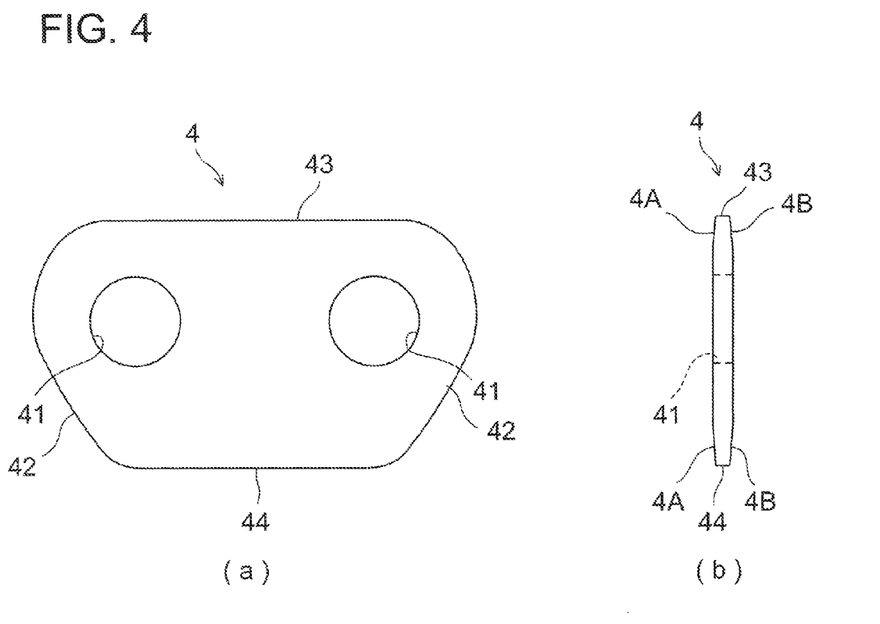

As shown in FIG. 4(*a*), the guide plates 4 have a pair of pin holes 41 into which the ends of the linking pins 3 are fixedly inserted. Furthermore, the guide plates 4 comprise side end parts 42 which are disposed at both ends in the longitudinal direction, and an upper end part 43 and lower end part 44 which link the side end parts 42 in the longitudinal direction. The upper end part 43 and lower end part 44 are both formed with a flat shape in the longitudinal direction in this example. As shown in FIG. 4(*b*), the upper end part 43 and lower end part 44 of the guide plates 4 both become steadily thinner toward the tip end.

In other words, the upper 43 and lower 44 end parts of the guide plates 4 have a tapered transverse section. In other words once again, the upper 43 and lower 44 end parts of the guide plates 4 have oblique side faces 4A, 4B which come into linear contact with the upright wall parts 56B, 57B of the chain guide 56 or tensioner arm 57, as will be described later. It should be noted that the side faces 4A in this instance are inside faces which are disposed on the inside in the width direction of the chain and lie opposite the link plates 2, while the side faces 4B are outside faces which are disposed on the outside in the width direction of the chain and lie opposite the upright wall parts 56B, 57B. Furthermore, the tapered-transverse-section upper 43 and lower 44 end parts of the guide plates 4 are formed by barrel finishing, for example.

The operational effects of this variation will be described next.

When the silent chain 1 is operating, the silent chain 1 travels while sliding over the chain guide 56 and tensioner arm 57.

The state of contact of the silent chain 1 and the chain guide 56 in this instance will be described with the aid of FIGS. 5 and 6. As shown in these figures, the chain guide 56 has a chain travel surface 56A over which the back surface of the chain 1 travels while sliding. The pair of upright wall parts 56B which extend in the longitudinal direction (the direction perpendicular to the page in FIGS. 5 and 6) along the chain travel surface 56A in an upstanding manner are formed on both lateral side edges of the chain travel surface 56A.

Figure 6:
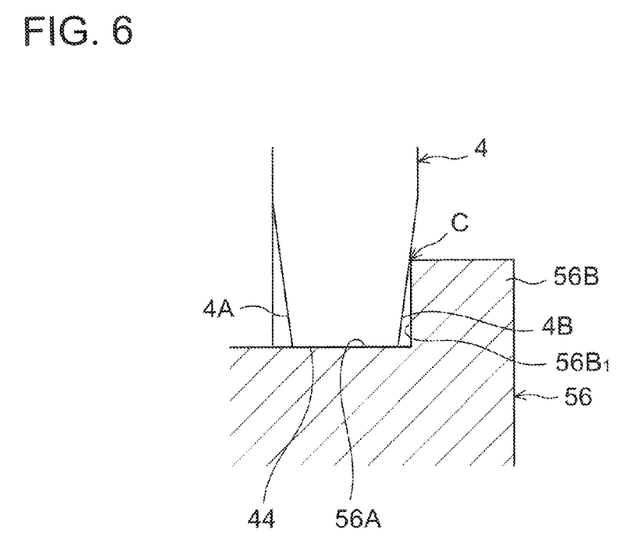
FIG. 6 is a partial enlargement of VI in FIG. 5.

As shown in FIG. 6, when the lower end part 44 of the guide plate 4 in the silent chain 1 comes into abutment over the chain travel surface 56A of the chain guide 56, the outside surface 4B of the guide plate 4 comes into contact with an inside surface 56B$_1$ of the upright wall part 56B of the chain guide 56 at a point C. It should be noted that in this case, the guide plate 4 is a member which extends perpendicular to the page in FIG. 6, and consequently the guide plate 4 comes into linear contact with the inside surface 56B$_1$ of the upright wall part 56B of the chain guide 56. That is to say, the region of contact between the guide plate 4 and the inside surface 56B$_1$ in this case is a straight line passing through the point C.

Accordingly, when the silent chain 1 is traveling while sliding over the chain travel surface 56A of the chain guide 56, the outside surface 4B of the guide plate 4 on the outermost side of the chain comes into linear contact with the upright wall part 56B$_1$ of the chain guide 56, which means that it is possible to reduce friction loss as the chain travels compared with the conventional case in which the outside surface of the guide plates makes surface contact.

Furthermore, deviation of the traveling chain in the width direction can be reliably restricted because at this point the outside surfaces 4B of the guide plates 4 on both outer sides in the width direction of the silent chain 1 come into linear contact with the upright wall parts 56B$_1$ of the chain guide 56.

It should be noted that when the silent chain 1 is traveling while sliding over the chain travel surface of the tensioner arm 57 too, the outside surfaces 4B of the guide plates 4 on the outermost sides of the chain come into linear contact with the inside surfaces of the upright wall parts of the tensioner arm 57, which means that it is possible to further reduce friction loss as the chain travels.

Furthermore, when the guide plate is produced, barrel finishing is generally carried out after the holes have been punched in the plate and the outer shape has been press-cut, and if the barrel finishing is carried out for longer than the normal processing time, it is clear that the tip end sections of the upper and lower end parts of the guide plate will undergo a greater amount of grinding than the base end sections, and it is possible to easily make the upper and lower end parts of the guide plate become steadily thinner toward the tip end by such a process.

In this way, according to one variation, it is possible to reliably restrict deviation of the chain during travel, and also to easily reduce friction loss when the chain is operating.

Figure 7:
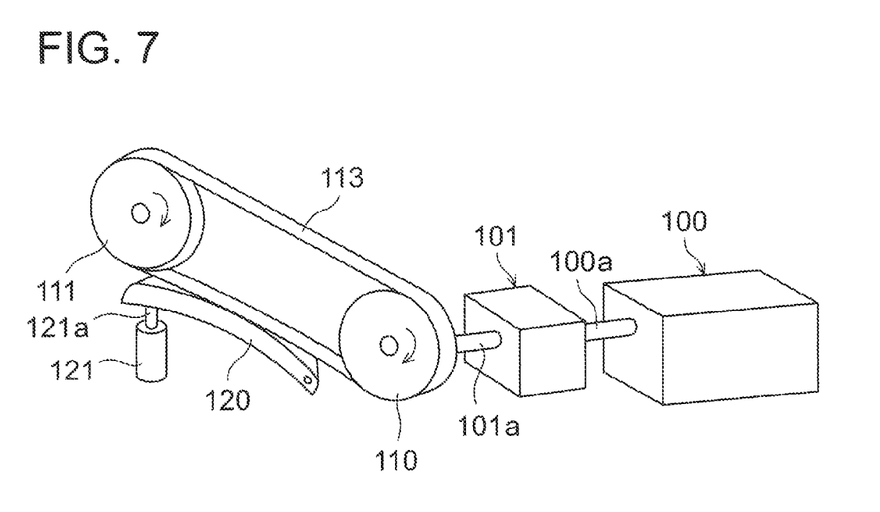
FIG. 7 is a schematic structural diagram of a first test apparatus for taking comparative measurements of resistance torque during operation of the silent chain according to one variation, and a conventional silent chain.
Figure 8:
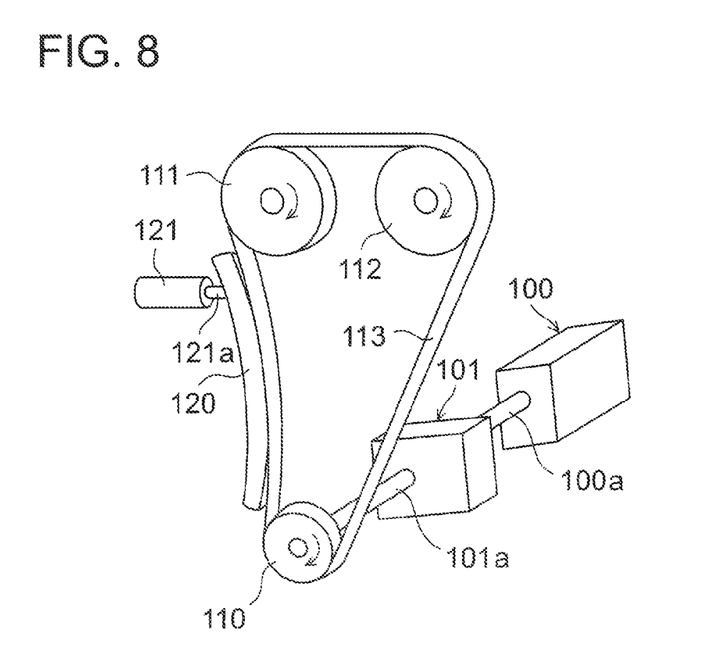
FIG. 8 is a schematic structural diagram of a second test apparatus for taking comparative measurements of resistance torque during operation of the silent chain according to one variation, and a conventional silent chain.

The resistance torque produced when the silent chain is traveling over the tensioner arm was measured and compared with that of a conventional silent chain using the test apparatuses shown in FIGS. 7 and 8 in order to confirm the effect of one variation on reducing friction loss in a silent chain.

In the first test apparatus shown in FIG. 7, an output shaft 100*a* of a motor 100 is input to a torque meter 101, and an output shaft 101*a* of the torque meter 101 is linked to a drive sprocket 110. A silent chain 113 is wound around the drive sprocket 110 and a driven sprocket 111. A tensioner arm 120 which can pivot about a pivoting end is disposed on the slack side span of the silent chain 113, and a piston rod 121*a* of a tensioner 121 pressures the free end of the tensioner arm 120.

In the same way, in the second test apparatus shown in FIG. 8, an output shaft 100*a* of a motor 100 is input to a torque meter 101, and an output shaft 101*a* of the torque meter 101 is linked to a drive sprocket 110. A silent chain 113 is wound around the drive sprocket 110 and two driven sprockets 111, 112. A tensioner arm 120 which can pivot about a pivoting end is disposed on the slack side span of the silent chain 113, and a piston rod 121*a* of a tensioner 121 pressures the free end of the tensioner arm 120.

Figure 9:
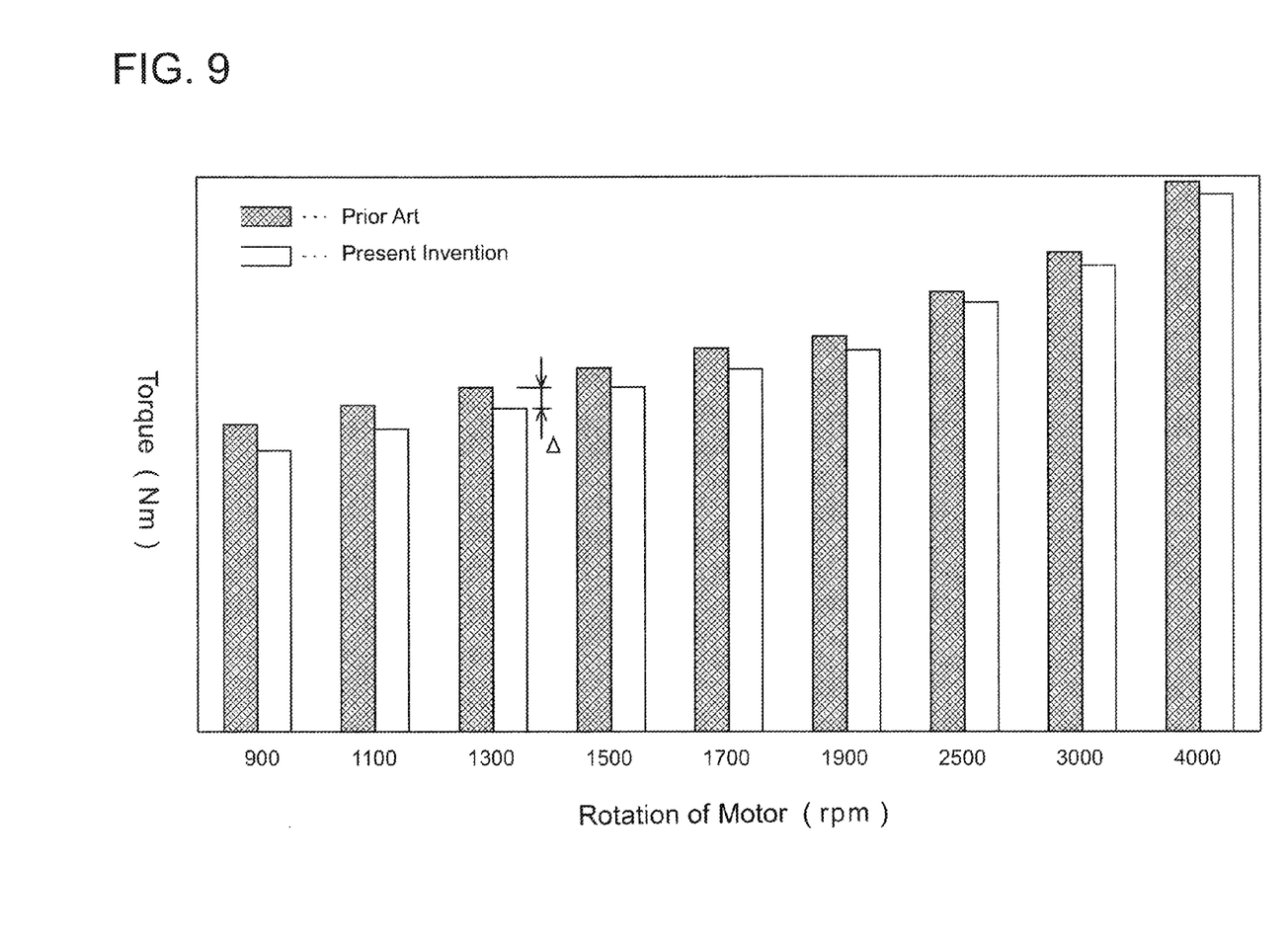
FIG. 9 is a graph showing the results of the comparative measurements of resistance torque carried out using the first test apparatus.

The resistance torque values measured using the torque meter 101 of the first test apparatus are shown in FIG. 9 for the silent chain according to one variation and a conventional silent chain. In FIG. 9, the horizontal axis shows the speed (rpm) of the motor 100, and the vertical axis shows the value of the resistance torque (Nm) measured by the torque meter.

As is clear from FIG. 9, the inventive article (silent chain according to one variation) showed a lower resistance torque than the conventional article (conventional silent chain) in all speed regions between 900 and 4000 (rpm). The difference A between the inventive article and the conventional article constitutes the amount of friction reduction.

These results demonstrate the fact that the silent chain according to the present invention makes it possible to reduce friction loss during chain operation.

It should be noted that an example has been described in the variation above in which both the upper 43 and lower 44 end parts of the guide plates 4 become steadily thinner toward the tip end, but it is sufficient for the purposes of the present invention if at least the lower end part 44 which comes into contact with the upright wall parts of the chain guide or tensioner arm becomes steadily thinner. In addition, it is sufficient for the purposes of the present invention if at least the outside surface 4B of the lower end part 44 which comes into contact with the upright wall part of the chain guide or tensioner arm has an oblique face which comes into linear contact with the upright wall part.

Furthermore, an example has been described in the variation above in which substantially trapezoidal guide plates without toe parts have been used as the guide plates 4, but what are known as low-rigidity guide plates that have toe parts at the upper end are also feasible for the guide plates used in the present invention.

In addition, an example has been described in the variation above in which a silent chain is adopted as the chain used in the present invention, but the present invention may equally be applied to a roller chain or a bush chain.

FIELD OF INDUSTRIAL APPLICATION

The present invention is suitable for chains having guide plates, and it is especially suitable when there is a need to reduce friction loss during operation.

KEY TO SYMBOLS

1: silent chain
2: link plate (inside link)

3: linking pin
4: guide plate
41: pin hole
42: side end part
43: upper end part
44: lower end part
4B: outside surface (oblique face)

PRIOR ART DOCUMENTS

Patent Documents

Figure 5:
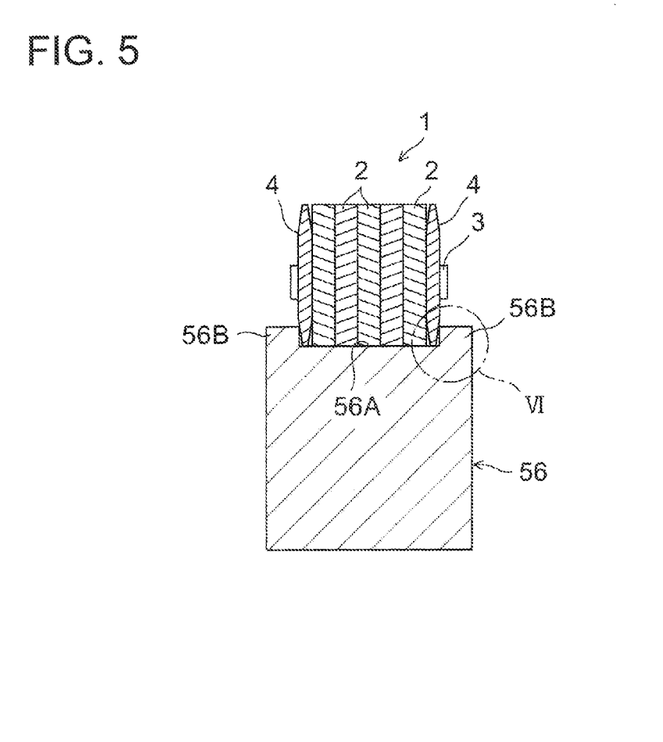
FIG. 5 illustrates the state of sliding contact between the silent chain and the chain guide, and corresponds to the cross section V-V in FIG. 1.

[Patent Document 1] Japanese Unexamined Patent Application Publication 2008-151316 (see FIGS. 4 and 6)
[Patent Document 2] Japanese Unexamined Patent Application Publication H10-19100 (see FIG. 8)
[Patent Document 3] Japanese Unexamined Patent Application Publication 2002-340113 (see FIGS. 4 and 5)

The invention claimed is:

1. A guide plate for use on the outermost side in the width direction of a chain comprising inside links which are pivotably linked by means of linking pins, wherein
the guide plate has a pair of pin holes into which the linking pins are inserted, and also has side end parts which are disposed at both ends in the longitudinal direction thereof, and upper and lower end parts which link the side end parts in the longitudinal direction; and the upper end part and/or the lower end part becomes steadily thinner toward the tip end.

2. The guide plate as claimed in claim 1, wherein at least one of the end parts is formed with a tapered transverse section.

3. The guide plate as claimed in claim 1, wherein the upper and lower end parts both become steadily thinner toward the tip end.

4. A product comprising a chain in which inside links having a pair of pin holes are pivotably linked by linking pins, and in which guide plates are disposed on the outermost side, wherein
the guide plates have a pair of pin holes into which the linking pins are inserted, and also have side end parts which are disposed at both ends in the longitudinal direction thereof, and upper and lower end parts which link the side end parts in the longitudinal direction; and the upper end part and/or the lower end part becomes steadily thinner toward the tip end.

5. The product as claimed in claim 4, wherein at least one of the end parts is formed with a tapered transverse section.

6. The product as claimed in claim 4, wherein the upper and lower end parts both become steadily thinner toward the tip end.

7. The product as claimed in claim 4 wherein the chain is a silent chain.

8. The product as claimed in claim 4 wherein the chain is a roller chain or a bush chain.

9. A product comprising a chain in which inside links having a pair of pin holes are pivotably linked by means of linking pins, and in which guide plates are disposed on the outermost side, wherein
the guide plates have a pair of pin holes into which the linking pins are inserted, and also have side end parts which are disposed at both ends in the longitudinal direction thereof, and upper and lower end parts which link the side end parts in the longitudinal direction; and the upper end part or the lower end part has an oblique face which comes into linear contact with upright wall parts of a chain guide or tensioner arm.

10. The product as claimed in claim 9 wherein the chain is a silent chain.

11. The product as claimed in claim 9 wherein the chain is a roller chain or a bush chain.

* * * * *